United States Patent
Carton et al.

(10) Patent No.: US 10,023,301 B2
(45) Date of Patent: Jul. 17, 2018

(54) METHOD AND SYSTEM FOR CONTROLLING THE FLIGHT OF AN AIRCRAFT WITH RESPECT TO THE PITCH AXIS

(71) Applicant: Airbus Operations (SAS), Toulouse (FR)

(72) Inventors: Mathieu Carton, Toulouse (FR); Pierre Debusschere, Lias (FR); Laurent Albugues, Plaisance du Touch (FR)

(73) Assignee: Airbus Operations SAS, Toulouse (FR)

( * ) Notice: Subject to any disclaimer, the term of this patent is extended or adjusted under 35 U.S.C. 154(b) by 156 days.

(21) Appl. No.: 15/096,812

(22) Filed: Apr. 12, 2016

(65) Prior Publication Data

US 2016/0304189 A1 Oct. 20, 2016

(30) Foreign Application Priority Data

Apr. 14, 2015 (FR) ...................................... 15 53269

(51) Int. Cl.
| | |
|---|---|
| *G05D 1/00* | (2006.01) |
| *B64C 13/22* | (2006.01) |
| *B64C 13/50* | (2006.01) |
| *B64C 13/04* | (2006.01) |
| *G05D 1/06* | (2006.01) |

(52) U.S. Cl.
CPC .............. *B64C 13/22* (2013.01); *B64C 13/04* (2013.01); *B64C 13/503* (2013.01); *G05D 1/0607* (2013.01)

(58) Field of Classification Search
CPC .......... G05D 1/04; G05D 1/06; G05D 1/0607; G05D 1/0623; G05D 1/0638; G05D 1/08; G05D 1/0808; G05D 1/0816; G05D 1/0833; B64C 13/04; B64C 13/16; B64C 13/18; B64C 13/22
See application file for complete search history.

(56) References Cited

U.S. PATENT DOCUMENTS

| | | | |
|---|---|---|---|
| 4,642,774 A * | 2/1987 | Centala ................ | G05D 1/0816 244/197 |
| 4,758,958 A * | 7/1988 | von Gersdorff ..... | G05D 1/0061 244/17.13 |
| 4,765,568 A | 8/1988 | Carl et al. | |

(Continued)

*Primary Examiner* — Richard G Davis
(74) *Attorney, Agent, or Firm* — Greer, Burns & Crain, Ltd.

(57) ABSTRACT

A system including a load factor control module for calculating a deflection order on manual actuation of a control column by a pilot of the aircraft and transmitting that deflection order to at least one elevator of the aircraft, a longitudinal attitude control module for maintaining the longitudinal attitude of the aircraft at a target attitude in the event of absence of manual actuation of the control column by the pilot during a flight, and a transition management module for determining and storing a present longitudinal attitude value of the aircraft at a recording moment and transmitting that longitudinal attitude value to the longitudinal attitude control module for the longitudinal attitude control module to use the longitudinal attitude value as the target attitude.

7 Claims, 4 Drawing Sheets

(56) References Cited

U.S. PATENT DOCUMENTS

| | | | |
|---|---|---|---|
| 6,334,592 B1* | 1/2002 | Tomio | G05D 1/0825 244/221 |
| 7,021,587 B1 | 4/2006 | Younkin | |
| 9,108,722 B2* | 8/2015 | Higuchi | B64C 13/16 |
| 2007/0246605 A1 | 10/2007 | Lavergne et al. | |
| 2009/0187292 A1* | 7/2009 | Hreha | B64C 13/04 701/4 |
| 2010/0042270 A1* | 2/2010 | Villaume | G05D 1/0623 701/4 |
| 2011/0137496 A1* | 6/2011 | Everett | B64C 13/08 701/3 |
| 2013/0138270 A1* | 5/2013 | Christensen | B64C 19/00 701/3 |
| 2015/0081140 A1* | 3/2015 | Moune | B64C 13/18 701/3 |

* cited by examiner

METHOD AND SYSTEM FOR CONTROLLING THE FLIGHT OF AN AIRCRAFT WITH RESPECT TO THE PITCH AXIS

CROSS-REFERENCES TO RELATED APPLICATIONS

This application claims the benefit of the French patent application No. 1553269 filed on Apr. 14, 2015, the entire disclosures of which are incorporated herein by way of reference.

BACKGROUND OF THE INVENTION

The present invention concerns a method and a system for controlling the flight of an aircraft, in particular a transport aircraft, with respect to the pitch axis.

A vertical load factor control law Nz is usually employed for the control with respect to the pitch axis of an aircraft having fly-by-wire controls. The object of this law Nz is to convert a pilot command (via deflection of the control column) into a load factor command. That command is converted into a deflection order for the elevators of the aircraft and applied to the elevators.

Moreover, it is known that, in particular on a transport aircraft, and notably on a military transport aircraft, certain operations such as an air-drop, for example, make it necessary to maintain a precise longitudinal attitude during these operations while retaining the capability to control the trajectory of the aircraft before and during these operations.

SUMMARY OF THE INVENTION

An object of the present invention is to control the flight of an aircraft with respect to its pitch axis enabling the pilot to retain the same sensitivity as is usual during active flight control while making it possible to address mission constraints such as those referred to above.

The present invention concerns a method of controlling the flight of an aircraft with respect to its pitch axis, the aircraft including fly-by-wire controls and a control column that can be actuated manually by a pilot of the aircraft at least for control of the pitch axis of the aircraft, the method including, during a flight of the aircraft, a load factor control step, used during manual actuation of the control column by the pilot and comprising determining a load factor control value representing the actuation of the control column, calculating from this load factor control value a deflection order and applying that deflection order to at least one elevator of the aircraft.

In accordance with the invention, the method also includes, during the flight of the aircraft:
  a longitudinal attitude control step, executed in the event of absence of manual actuation of the control column by the pilot and comprising maintaining the longitudinal attitude of the aircraft at a target attitude; and
  a phase of transition from the load factor control step to the longitudinal attitude control step, the transition phase comprising determining and storing a present longitudinal attitude value of the aircraft at a recording moment and transmitting that longitudinal attitude value to the subsequent longitudinal attitude control step, for the latter to use it as the target attitude.

Accordingly, thanks to the combination of the two control steps (the usual step of application of a load factor control law upon actuation of the control column; the step of application of an attitude maintaining law upon releasing the column) and the provision of a transient phase, the respective advantages of the two steps are obtained, while preventing unwanted disturbances during the transition phase and notably preventing overshooting the longitudinal attitude value.

To be more precise, thanks to the invention, the aircraft flight control sensitivity is the same as usual for the pilot (i.e., when applying only a load factor control law), so that the pilot is not disturbed and continues to have the usual flight control sensations, and maintaining the longitudinal attitude is guaranteed in the absence of input (or commands or actuations) by the pilot, which makes it possible to respond to the constraints of a mission such as an air-drop, for example.

Although it is more particularly applicable to an air-drop phase, for which it is important to maintain a constant longitudinal attitude to obtain an accurate air-drop, the present invention applies to any flight phase and to any type of aircraft where the requirement is to maintain the longitudinal attitude constant (and equal to a target value (or attitude)) in the absence of actuation of the control column by the pilot.

Advantageously:
  the transition phase includes a sub-step comprising determining a moment of activation of the longitudinal attitude control law and adding a predetermined time to this activation moment to obtain the recording moment; and
  the sub-step of the transition phase comprises determining, as the moment of activation of the longitudinal attitude control law, the moment at which the absolute value of the angle of deflection of the control column has been below a predetermined value for a predetermined time.

The present invention also concerns a system for controlling the flight of an aircraft with respect to its pitch axis, the system including a load factor control module configured to calculate a deflection order upon manual actuation of a control column by a pilot of the aircraft during a flight from a load factor control value representing the actuation of the control column and to transmit that deflection order to at least one elevator of the aircraft.

In accordance with the invention, the system further includes:
  a longitudinal attitude control module configured, in the event of absence of manual actuation of the control column by the pilot during a flight, to maintain the longitudinal attitude of the aircraft at a target attitude; and
  a transition management module configured to determine and to store a present longitudinal attitude value of the aircraft at a recording moment and transmitting that longitudinal attitude value to the longitudinal attitude control module for it to use it at the target attitude.

In one particular embodiment, the system includes a module for determining a moment of activation of the longitudinal attitude control law, the activation moment being used to determine the recording moment.

The present invention further concerns an aircraft, in particular a transport aircraft, and notably a military transport aircraft, that includes a system such as that specified above.

BRIEF DESCRIPTION OF THE DRAWINGS

The appended figures explain how the invention may be reduced to practice. In these figures, identical references designate similar elements.

DETAILED DESCRIPTION OF THE PREFERRED EMBODIMENTS

Figure 1:
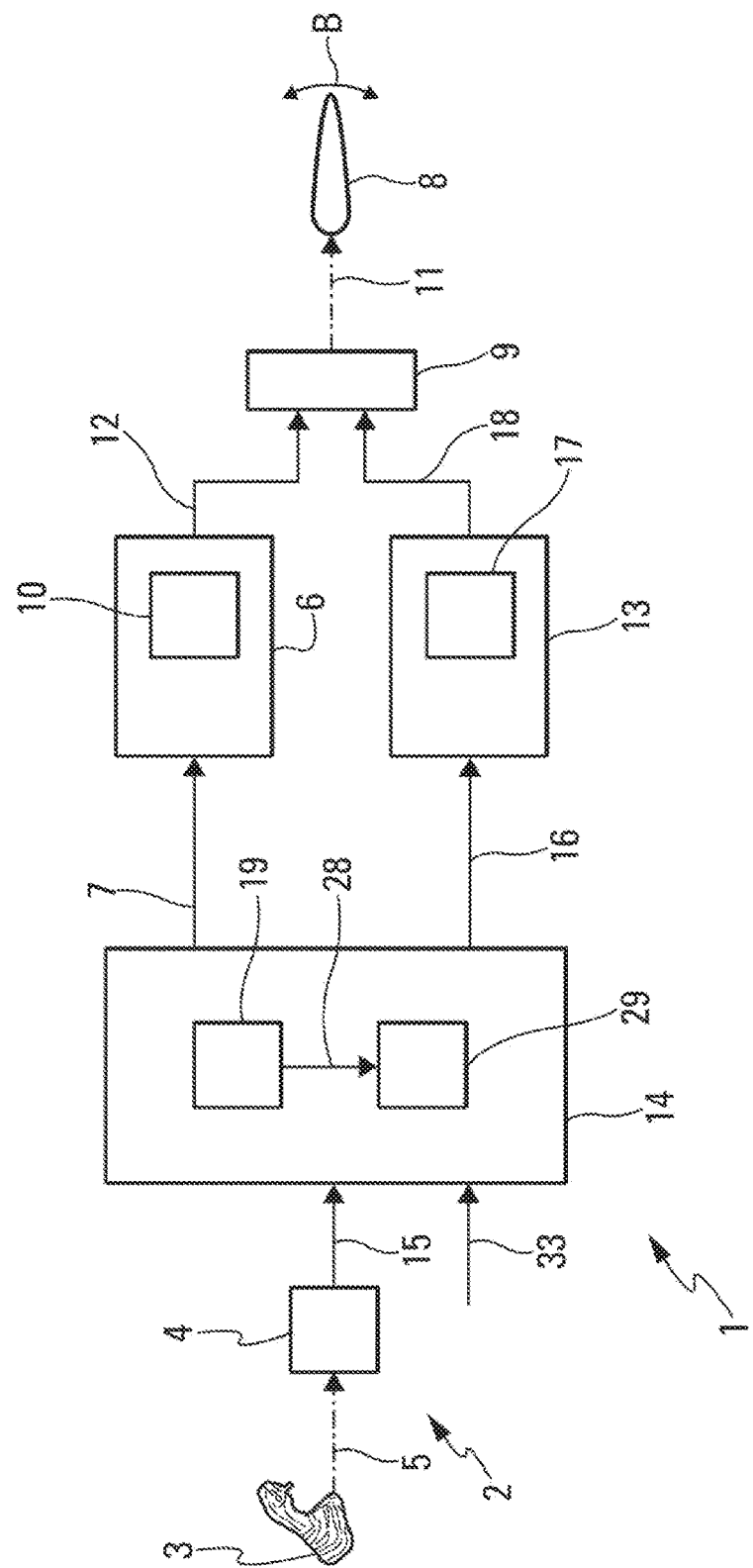
FIG. 1 is the block schematic of a flight control system, illustrating one embodiment of the invention.

A flight control system 1 represented diagrammatically in FIG. 1 and used to illustrate the invention is a flight control system of an aircraft AC (FIG. 4), in particular a transport aircraft, and notably a military transport aircraft. This flight control system 1 (which forms part of the fly-by-wire controls of the aircraft AC) is notably intended to control the aircraft AC with respect to its pitch axis.

This onboard system 1 includes:
- at least one unit 2 for generating a (vertical) load factor control value. The unit 2 includes as usual a control column (or member) 3, notably a joystick, that can be actuated manually by a pilot of the aircraft, and as usual means 4 for automatically generating a load factor control value that represents the actuation of the control column 3 (as illustrated by a connection 5 in chain-dotted line);
- a load factor control module (hereinafter called "module 6") that includes as usual a calculation unit 10, this calculation unit 10 being configured to calculate, as usual, at least one deflection order of at least one elevator 8 of the aircraft AC based on a load factor control value received via a connection 7; and
- at least one elevator 8 that as usual is associated with at least one actuator 9 and that can be turned as represented by a double-headed arrow B. The actuator 9 is configured as usual to operate on the elevator 8, as illustrated by a connection 11 in chain-dotted line, in order to apply to the elevator 8 a deflection order calculated by the module 6 and received via a connection 12.

In the context of the present invention, the load factor in question is a vertical load factor.

The module 6 applies as usual a known law of C* or Nz type that is not described further in the following description.

As usual a law Nz implements load factor control producing neutral stability (with the control column 3 in the neutral position, the slope angle of the flight trajectory is preserved in the short term), automatic horizontal stabilizer compensation (in level flight the elevators are brought progressively to the zero position) and up to 37° of lateral attitude compensation in a turn. This law Nz enables control of the trajectory of the aircraft AC but not its longitudinal attitude.

In accordance with the invention, the system 1 further includes:
- a longitudinal attitude control module (hereinafter "module 13"), which is configured, in the absence of manual actuation of the control column 3 by the pilot during a flight, to maintain the longitudinal attitude θ of the aircraft AC at a target attitude tgt; and
- a transition management module (hereinafter "module 14"), which is connected by connections 15, 16 and 7 to the means 4, the module 13 and the module 6, respectively, and which is configured to determine and to store a present longitudinal attitude value of the aircraft AC at a recording moment specified below and to transmit this (determined and stored) longitudinal attitude value to the (longitudinal attitude control) module 13 for it to use it as the target attitude.

The module 13 includes a calculation unit 17 (connected to the actuator 9 by a connection 18, for example), which as usual applies a longitudinal attitude maintaining law (hereinafter law θ).

In order to maintain the longitudinal attitude of the aircraft AC, the module 13 uses a target angle (target attitude θtgt). The law θ is a pitch law with a PID (proportional integral derivative) type algorithm with a target angle objective. The target attitude θtgt is defined between a usual predetermined maximum value θmax and a usual predetermined minimum value θmin.

Using the law θ as usual, the calculation unit 17 determines deflection orders of the elevator 8, notably as a function of the sum of:
- the integral of the difference between θ and θtgt, to which a gain is applied;
- the value of θtgt, to which a gain is applied;
- the integral of the pitch rotation speed, to which a gain is also applied; and
- this pitch rotation speed, to which a gain is applied.

Accordingly, thanks to the combination of the two control laws (the load factor control law Nz on actuating the control column 3; the attitude maintaining law θ on releasing the control column 3) and the application of management of the transition between these two laws (via the module 14), the system 1 makes it possible to obtain the respective advantages of the two laws while preventing unwanted disturbances during the transition phase and notably preventing overshooting of the longitudinal attitude value.

To be more precise, thanks to the system 1 and to the combination of the modules 6, 13 and 14 in particular, the flight control sensitivity of the aircraft is the same as usual for the pilot (i.e., when applying only a load factor control law), so that the pilot is not disturbed and retains their usual flight control sensations, and maintaining of the longitudinal attitude is guaranteed in the absence of inputs (or commands or actuations) by the pilot, which makes it possible to respond to mission constraints.

The system 1 is particularly appropriate for the air-drop of at least one load by the aircraft AC, for which it is important to maintain a constant longitudinal attitude to achieve a precisely located air-drop. However, the system 1 may be used in any flight phase (and on any type of aircraft) where it is required to maintain the longitudinal attitude constant (and equal to a target attitude) in the absence of actuation of the control column 3 by the pilot.

The system 1 includes an activation unit 19 for activating the law θ and is preferably integrated into the module 14.

Figure 2:
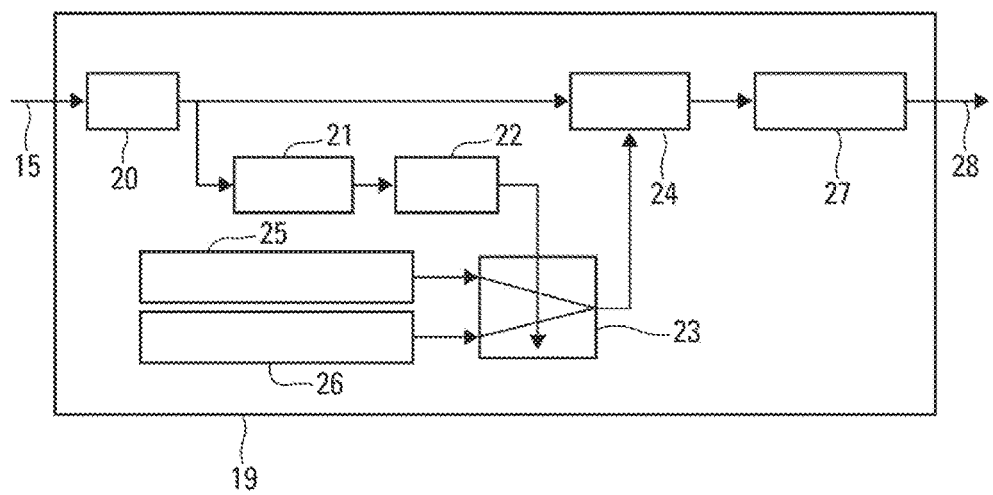
FIGS. 2 and 3 are block schematics of calculation units of a flight control system.

In one particular embodiment, represented in FIG. 2, this activation unit 19 includes:
- a calculation element 20 that calculates the absolute value of the actuation order generated on the control column 3, as determined by the means 4 and received via the connection 15; this makes it possible to take into account an actuation whether it is to dive or to pull up;
- a calculation element 21 that calculates the differential of this absolute value;
- a calculation unit 22 that deduces therefrom the sign to actuate a switching element 23; that switching element 23 makes it possible to link to a filter 24 a slow constant (unit 25) or a fast constant (unit 26); the filter 24 receives the absolute value from the calculation element 20 and applies a hysteresis to prevent untimely activations; and a calculation element 27 for comparing the value supplied by the filter 24 to a threshold value and sending an activation order via a connection 28 if the value concerned is below the threshold (and the control column 3 is therefore close to the neutral position).

The value of the fast constant (unit 26) is chosen to switch very rapidly from the law θ to the law Nz whereas the value of the slow constant (unit 25) is chosen to prevent too many transitions during piloting.

The system 1 further includes a management unit 29 for managing the target attitude that is preferably integrated into the module 14.

Figure 3:
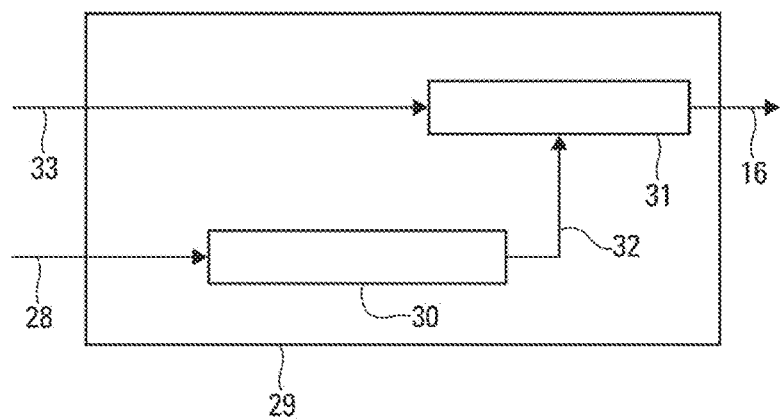

As represented in FIG. 3, this management unit 29 includes:

a calculation element 30 that receives, via the connection 28, the activation moment determined by the activation unit 19 (FIG. 3) and which adds to it a predetermined confirmation time Δt to obtain a recording moment; the calculation element 30 then transmits this recording moment to a storage element 31 via a connection 32; and the storage element 31 that receives the present value of the longitudinal attitude via a connection 33 from the usual means (not shown) of the aircraft that measure or determine this longitudinal attitude.

The storage element 31 stores the present value of the longitudinal attitude of the aircraft, as it exists at the recording moment, and transmits it as a new target attitude via the connection 16 to the unit 17 of the module 13.

The combination of the modules 6, 13 and 14 therefore makes it possible to manage the transition from the law Nz to the law θ in order to have the same sensitivity of the aircraft during piloting and to maintain θ without input on the part of the pilot. It makes it possible to maintain θ with no input from the pilot with the sensitivity of the law Nz during piloting.

Figure 4:
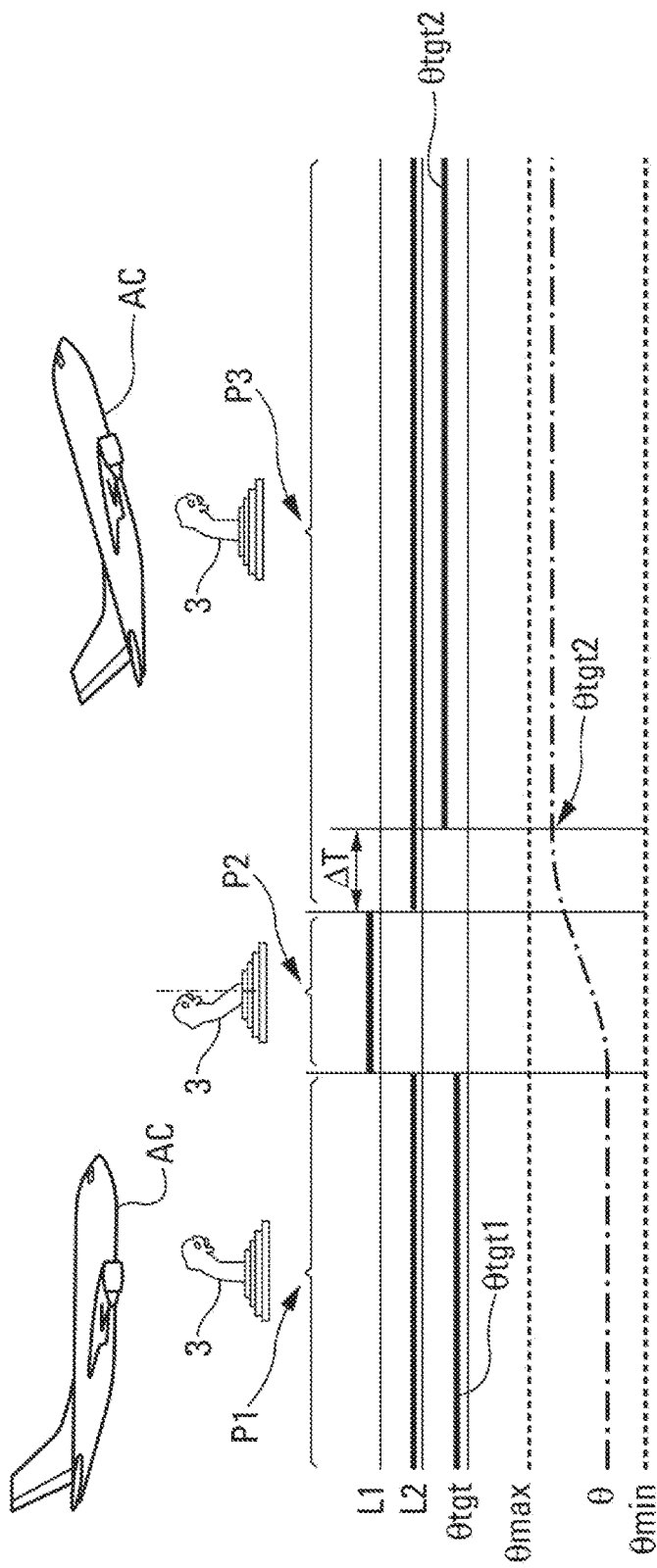
FIG. 4 shows the application as a function of time of a system illustrating the invention on an aircraft in conjunction with the position of a control column of the aircraft.

FIG. 4 illustrates an example of application of the system 1 to an aircraft AC. This FIG. 4 shows three successive phases P1, P2 and P3 for which:

the control column 3 is in the neutral position (phase P1);
the control column 3 is actuated to pull up (phase P2); and
the control column 3 is returned to the neutral position (phase P3).

FIG. 4 also shows the evolution of various parameters during these phases P1, P2 and P3, namely:

the activation of the law Nz (L1);
the activation of the law θ (L2);
the evolution of the target attitude θtgt;
the evolution of the present value θ of the longitudinal attitude, which is defined between a maximum value θmax and a minimum value θmin.

To be more precise, for this example from FIG. 4, at the beginning (phase P1), the control column 3 is released (neutral position) and the law θ (L2) is completely active, targeting a target attitude θtgt1. Upon actuation of the control column 3 by the pilot to control the trajectory (phase P2), there occurs a rapid transition between the law θ (L2) and the law Nz (L1) and the target θtgt is forced to become equal to θ. On releasing the control column 3 (phase P3) and after a short delay (Δt), a new target attitude (θtgt2) is fixed and the law θ (L2) functions completely to enable the attitude angle to be maintained at this new stored target attitude θtgt2.

The confirmation time Δt used depends on the response of the aircraft in terms of longitudinal attitude. The objective is to fix the target attitude and to activate the law θ just before the usual overshooting of θ (to prevent it).

Figure 5:
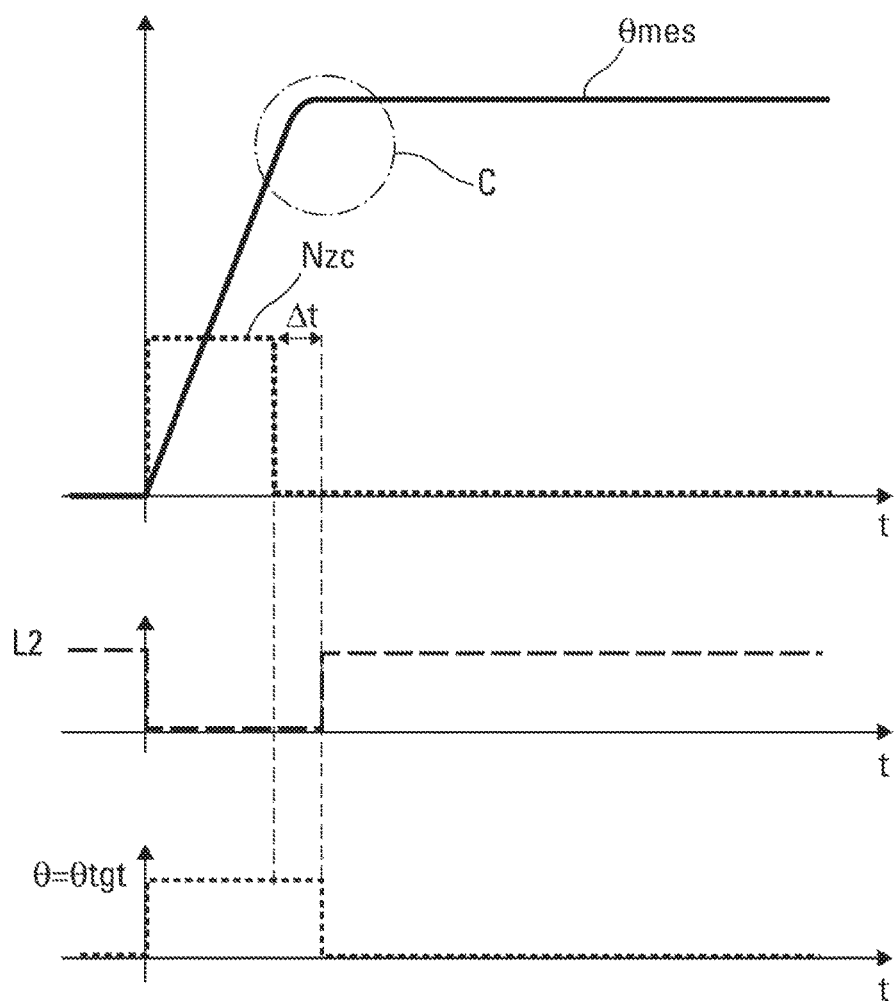
FIG. 5 is a graph illustrating an effect obtained by use of the invention.

With this structure and the choice of slow and fast constants, and also the confirmation time Δt, the resumption in terms of θ is as represented in FIG. 5.

FIG. 5 shows various superimposed graphs showing the evolution of parameters during the time t, namely:

the load factor control value Nzc (controlled load factor);
the present longitudinal attitude θmes as measured;
the activation of the law θ (L2); and
the taking into account of the target attitude θtgt.

It is seen that, thanks to the invention, there is no overshooting of the measured longitudinal attitude θmes at the plateau level illustrated by a circle C in FIG. 5.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of controlling the flight of an aircraft with respect to a pitch axis, the aircraft including fly-by-wire controls and a control column that can be actuated manually by a pilot of the aircraft at least for control of the pitch axis of the aircraft, the method comprising, during a flight of the aircraft:

a load factor control step, used during manual actuation of the control column by the pilot and comprising:
determining a load factor control value representing the actuation of the control column,
calculating from this load factor control value a deflection order and
applying that deflection order to at least one elevator of the aircraft, a longitudinal attitude control step, executed in the event of absence of manual actuation of the control column by the pilot and comprising:
maintaining the longitudinal attitude of the aircraft at a target attitude; and a phase of transition from the load factor control step to the longitudinal attitude control step, the transition phase comprising:
determining and storing a present longitudinal attitude value of the aircraft at a recording moment, and
transmitting the longitudinal attitude value to the subsequent longitudinal attitude control step, for the subsequent longitudinal attitude control step to use the longitudinal attitude value as the target attitude;

wherein the transition phase includes a sub-step comprising determining a moment of activation of a longitudinal attitude control law θ upon the absence of manual actuation of the control column by the pilot and, using a management unit, adding a predetermined time to the activation moment to obtain the recording moment.

2. The method as claimed in claim 1, wherein said sub-step of the transition phase comprises determining as the moment of activation of the longitudinal attitude control law the moment at which the absolute value of the angle of deflection of the control column has been below a predetermined value for a predetermined time.

3. The method as claimed in claim 1, further comprising employing a fast constant to switch very rapidly from the longitudinal attitude control law $\theta$ to a vertical load factor control law upon manual actuation of the control column by the pilot.

4. A system for controlling a flight of an aircraft with respect to a pitch axis, said system comprising:
   a load factor control module configured to calculate a deflection order upon manual actuation of a control column by a pilot of the aircraft during the flight, from a load factor control value representing the actuation of the control column, and to transmit the deflection order to at least one elevator of the aircraft,
   a longitudinal attitude control module configured, in the event of absence of manual actuation of the control column by the pilot during the flight, to maintain a longitudinal attitude of the aircraft at a target attitude; and
   a transition management module configured to determine and to store a present longitudinal attitude value of the aircraft at a recording moment and to transmit the stored longitudinal attitude value to the longitudinal attitude control module for the longitudinal attitude control module to use the stored longitudinal attitude value as the target attitude;
   further including a module for determining a moment of activation of a longitudinal attitude control law $\theta$ upon the absence of manual actuation of the control column by the pilot and a management unit for adding a predetermined time to the activation moment to obtain the recording moment.

5. An aircraft comprising:
   a flight control system comprising:
   a load factor control module configured to calculate a deflection order upon manual actuation of a control column by a pilot of the aircraft during the flight, from a load factor control value representing the actuation of the control column, and to transmit the deflection order to at least one elevator of the aircraft,
   a longitudinal attitude control module configured, in the event of absence of manual actuation of the control column by the pilot during the flight, to maintain a longitudinal attitude of the aircraft at a target attitude; and
   a transition management module configured to determine and to store a present longitudinal attitude value of the aircraft at a recording moment and to transmit the stored longitudinal attitude value to the longitudinal attitude control module for the longitudinal attitude control module to use the stored longitudinal attitude value as the target attitude;
   further including a module for determining a moment of activation of a longitudinal attitude control law $\theta$ upon the absence of manual actuation of the control column by the pilot and a management unit for adding a predetermined time to the activation moment to obtain the recording moment.

6. The aircraft as claimed in claim 5, including an activation unit employing a fast constant to switch very rapidly from the longitudinal attitude control law $\theta$ to a vertical load factor control law upon manual actuation of the control column by the pilot.

7. The system as claimed in claim 4, including an activation unit employing a fast constant to switch very rapidly from the longitudinal attitude control law $\theta$ to a vertical load factor control law upon manual actuation of the control column by the pilot.

* * * * *